Figure 1:
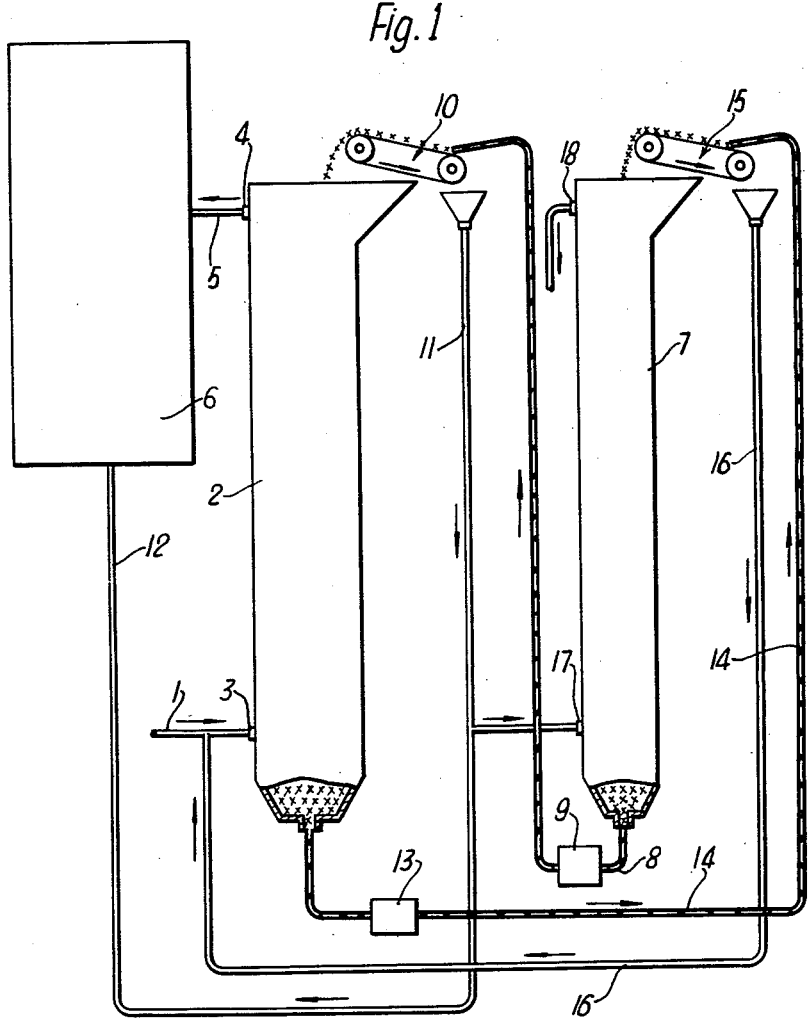

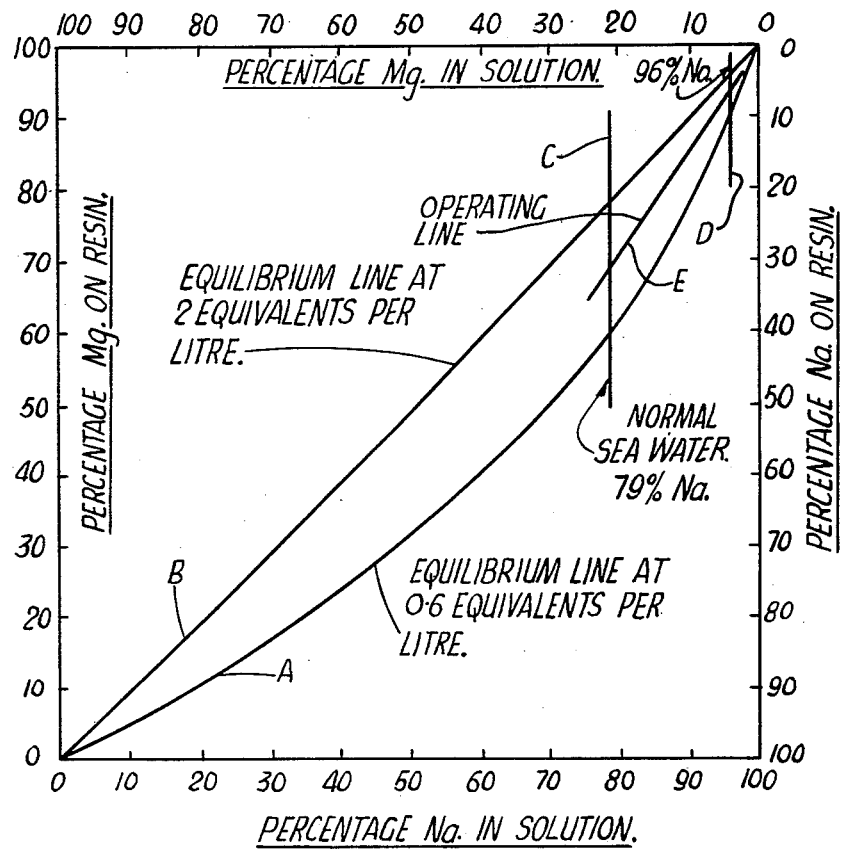

3,160,585
METHOD OF REDUCING THE SCALE FORMING ELEMENT ON SURFACES OF AN EVAPORATOR
James Ratcliffe Emmett and James McGrath, Newcastle-upon-Tyne, and Kevin Connaughton, Northumberland, England, assignors, by mesne assignments, to Weir Water Treatment Limited, Purley, Surrey, England, a British company
Filed Aug. 31, 1961, Ser. No. 135,290
Claims priority, application Great Britain, Sept. 2, 1960, 30,395/60
2 Claims. (Cl. 210—26)

This invention relates to a process and apparatus for reducing the formation of scale on the heat-transfer surfaces of evaporators, particularly evaporators for the production of distilled water from saline water such as sea water.

One of the difficulties encountered in using an evaporator for the distillation of saline water is that "hardness" constituents, such as calcium and magnesium contained therein in the form of bivalent cations, are precipitated and form an insoluble scale on the heat-transfer surface of the evaporator, thus causing a serious loss of output. In order to overcome this problem, chemical processes are frequently used to soften the evaporator feed water prior to its entry into the evaporator. An example of such chemical processes is an ion-exchange process in which the calcium and/or magnesium ions present in the feed water are exchanged for sodium ions. To achieve this exchange, the water is passed through a vessel containing a bed of cation-exchange resin material the ionic strength of which consists predominantly of sodium ions. As a result, the calcium and magnesium ions in the water are absorbed by the resin and are replaced by the sodium ions which pass from the resin into the water. This process is continued until the bed of ion-exchange material is depleted of sodium ions to an extent that the desired reaction can no longer take place. On reaching this stage the process is interrupted and the bed of cation-exchange material is regenerated by passing a strong solution containing sodium ions, for example, a solution of sodium chloride, through the bed.

A disadvantage of the process outlined above is that its chemical efficiency is not very high as, in general, it consumes substantially double the quantity of sodium ions than is called for stoichiometrically. Thus, the operating costs of this process are high. Moreover, even if the ion-exchange efficiency of the process could be improved, its operating costs, or the operating costs of any other process relying exclusively on chemicals from an external source, would still be high when applied to the softening of water having a very high hardness content such as sea water.

The aim of the present invention therefore is to overcome at least some of the disadvantages inherent in the ion-exchange process described above, particularly in its application for the prevention of scale formation on evaporator heat exchange surfaces.

According to the invention, a process for reducing the formation of scale on the heat-transfer surface or surfaces of an evaporator comprises passing raw water to be evaporated in counter-current contact with an ion-exchange material which is passed continuously through a treatment vessel so that scale forming constituents contained as bivalent ions in the raw water are absorbed from the water prior to its entry into the evaporator and are replaced by monovalent ions from the ion-exchange resin, distilling some of the thus-treated water in the evaporator while conveying the bivalent-ion-enriched resin to a regenerator vessel, passing the enriched resin through the regenerator vessel in counter-current contact with a regenerant solution which consists of or comprises undistilled concentrated solution discharged from the evaporator, and returning regenerated resin from the regenerator vessel to the treatment vessel.

The invention also extends to apparatus for carrying out this process. An example of a process and apparatus in accordance with the invention will now be described with reference to the accompanying drawings, in which:

FIGURE 1 is a diagrammatic view of the apparatus; and
FIGURE 2 is an equilibrium diagram illustrating results obtained with a sulphonated polystyrene-divinyl-benzene type of cation-exchange resin in contact with a solution having a varying ratio of sodium to magnesium ions.

The manner in which the apparatus shown in FIGURE 1 is operated serves to illustrate the process of the invention. Thus, raw water to be softened is conveyed from a source of supply (not shown) through a pipe 1 into a treatment vessel which is enters through an inlet 3 located close to the bottom of the vessel. The water then passes upwardly through the vessel 2 in counter-current contact with a cation-exchange resin and leaves it through an outlet 4 located close to the top of the vessel. From here the water is conveyed through a pipe 5 to a multi-stage flash evaporator 6. The resin is fed into the vessel 2 at its top and has an exchangeable capacity which, at the moment of entering the vessel 2, consists substantially of sodium ions. The resin is conveyed to the vessel in a carrier liquid from a regenerator vessel 7 through a pipe 8 by means of a pump 9, but is separated from the carrier liquid before entry into the vessel 2 by being discharged from the pipe 8 onto a sloping perforated conveyor belt 10. The carrier liquid consists of regenerating liquid in the form of evaporated blow-down, that is to say, undistilled concentrated solution discharged from the evaporator 6, and is drained into a pipe 11 which is connected to a pipe 12 serving to convey blow-down from the evaporator 6 to the regenerator vessel 7. Instead of conveying the resin directly from the regenerator vessel 7 to the treatment vessel 2, it may be advantageous to convey the resin through a rinsing vessel (not shown). In this instance, the carrier liquid for carrying the resin from the rinsing vessel to the treatment vessel must not be combined with the regenerating liquid.

During the downward passage of the resin through the vessel 2, it exchanges sodium ions for calcium and magnesium ions in the raw water. The dissolved solids in the water emerging from the treatment vessel 2 through the outlet 4 therefore consist mainly of sodium salts so that the solution can be concentrated in the evaporator 6 without any danger of scale forming on the heat-transfer surfaces. The cation-exchange resin which emerges from the vessel 2 through an outlet at or near the bottom of the vessel is enriched in calcium and magnesium ions and is pumped together with water from the vessel 2 which acts as a carrier through a pipe 14 by a pump 13, the resin and carrier liquid being discharged from the pipe 14 onto another sloping perforated conveyor belt 15. The resin is drained on the belt 15 and, after being discharged from the belt, enters the regenerator vessel 7 through an opening at its top while the carrier liquid is collected in and conveyed through a drain pipe 16 which is joined to the pipe 1 feeding raw water into the vessel 2. The resin gravitates through the vessel 7 in counter-current contact with the regenerant, namely, the evaporator blow-down, which enters the vessel 7 through an inlet 17 and which passes upwardly through the vessel and is discharged to waste from an outlet 18 located close to the top of the vessel. The regenerated resin is returned, as already indicated, by the pump 9 to the treatment vessel 2 for the start of a new cycle.

It is advantageous for the cation-exchange material used in the process to be of a type having a variable absorption affinity in respect of different cations, the variation being determined by the total concentration of the ions in the liquid in contact with the resin. This is illustrated in the diagram of FIGURE 2 which shows the equilibrium conditions of a sulphonated polystyrene-divinyl benzene type of cation-exchange resin when it is in contact with a synthesized solution having a varying ratio of sodium ions to magnesium ions at a total cationic concentration of 0.6 equivalent per litre (line A) and 2.0 equivalents per litre (line B). The magnesium-sodium relationship is illustrated as these ions form the major monovalent and bivalent constituents of the cationic strength of sea water. The synthesized solution actually used contained 79% of its total cationic strength in the form of sodium and 21% as magnesium so as to correspond substantially to sea water with respect to the ratio of monovalent and bivalent cations. Further, the equilibrium relationship at a total concentration of 0.6 equivalent per litre was chosen as this concentration is approximately that of normal sea water. The equilibrium conditions at the total cationic strength of 2 equivalents per litre is typical of the conditions which can apply to the concentrated solution removed as blowdown from an evaporator.

Assuming now that it is desirable to reduce the bivalent cation content of the sea water fed to the evaporator 6 from 21% to 4% in order to prevent any substantial formation of scale, the solution leaving the treatment vessel 2 should have a cation composition of 96% sodium and 4% magnesium. For the ion exchange to take place, the ion exchange resin introduced into the top of the vessel 2 must have a sodium content which is greater than the equilibrium value for the quantity of treated water required. This means that, with a solution having a cationic content of 96% sodium when the total solution strength is 0.6 equivalent per litre, the equilibrium composition of the ionic content of the resin would be, as indicated in FIGURE 2, 90.5% sodium. Therefore, in this example, ion exchange resin having its exchangeable capacity consisting of 93.5% sodium is introduced into the top of vessel 2. Because its sodium content is greater than the equilibrium value for a total solution strength of 0.6 equivalent per litre, ion exchange takes place and sodium ions pass from the resin into the solution and magnesium ions pass from the solution into the resin. The ion exchange resin flows in counter-current contact with the evaporator feed water under treatment, and the process of exchanging sodium ions from the ion exchange resin for magnesium ions from the feed solution therefore continues until the ion exchange resin reaches the bottom of vessel 2 and is extracted. In this counter-current process the cationic composition of the feed solution changes from 79% sodium as it enters the bottom of the vessel 2 to 96% sodium as it leaves the vessel 2 (see lines C and D in FIGURE 2). The composition of the exchangeable capacity of the ion exchange resin changes from its initial value of 93.5% sodium to 70% sodium as it leaves the vessel 2, its change in composition during the passage downwards through the vessel being shown by the operating line E indicated in FIGURE 2.

As already stated above, after substantially all its magnesium content has been removed from the solution it is conveyed as feed water to the evaporator 6 where part of the solution is evaporated. That part of the solution which is not evaporated therefore becomes more concentrated, and although different degrees of concentration are possible the solution in the particular example under consideration is concentrated in the evaporator 6 so that its cationic strength amounts to 2 equivalents per litre. The ratio of sodium to magnesium ions remains substantially unchanged. The solution at this concentration is removed as blowdown from the evaporator, the blowdown being conveyed through the pipe 12 to the regenerator vessel 7 through which it is passed upwardly in counter-current contact with resin discharged into the top of the vessel 7 from the belt 15. The ion exchange resin fed into the vessel 7 is now in a form where its exchangeable capacity is 70% sodium and 30% magnesium. As indicated above, the solution into which the resin is introduced has a total cationic strength of 2 equivalents per litre, and under these conditions the equilibrium composition of the resin would be 78% sodium and 22% magnesium. Because of this out-of-balance between the exchange material composition and equilibrium composition of the resin, ion exchange takes places in a "reverse direction" to that occurring in the vessel 2, that is to say, sodium from the solution enters the resin and magnesium on the resin leaves it to enter the solution. The counter-current contact between the solution and the resin results in the composition of the solution within the vessel 7 being changed from 96% at the inlet to 79% at the outlet, while the composition of the cationic content of the resin changes from the initial value of 70% at which it is introduced into vessel 7 to 93.5% as it leaves vessel 7. It will be noted that this is the value of percent sodium of the exchangeable capacity of the resin required to be introduced into the treatment vessel 2.

The process of counter-current ion exchange described above requires sufficient contact time between the two media and a correct ratio of quantity of resin to quantity of solution. The slope of the operating line E shown in FIGURE 2 is governed by the ratio of the quantity of resin to the quantity of solution, and this should be chosen so that it is in a mid position between the two equilibrium lines A and B or near to the mid position. In one set of experiments giving satisfactory results, synthesized raw water was fed at a rate of 1000 lb./hr. into and through the vessel 2 in counter-current to 3.71 cu. ft. of the specific cation exchange resin referred to previously. Leaving out of account the quantity of water used as a resin carrier between the vessels 2 and 7, a yield of 1000 lb./hr. of evaporator feed water was obtained, and blowdown at a rate of 300 lb./hr. was fed to and through the vessel 7 in counter-current to 3.71 cu. ft. of resin.

It is possible that the cationic content of the dissolved solids in the evaporator feed water may consist mainly of bivalent cations with comparatively few, if any, monovalent cations being present. In this instance, the quantity of monovalent cations in the blow-down available for regenerating the ion-exchange resin is substantially the stoichiometric equivalent of the amount of calcium and/or magnesium ions previously removed from the evaporator feed water and now to be removed from the resin, so that in order to achieve the required regeneration the regenerator would have to operate at a chemical exchange efficiency allowing no loss whatever. In practice, this is either impossible or difficult to achieve as it would require a regenerator providing a contact time for counter-current contact between the blow-down and the resin approaching infinite time. The contact time can in fact be increased substantially if the path of the resin particles passing through the regenerator vessel is rendered tortuous, but an unduly long contact time may either interfere with the evaporator output or else may require too great a capital outlay for the ion-exchange plant. These conflicting aims can be overcome, however, by adding to the evaporator blow-down in those cases where its monovalent cation content is only the stoichiometric equivalent of the bivalent cations removed from the feed water, an appropriate amount of monovalent cations prior to its entry into the regenerator section. As a result, the blow-down will now contain a sufficient excess of sodium ions capable of reconverting the cation-exchange resin within an operationally acceptable period of time into the required sodium form necessary for its satisfactory use in the treatment vessel 2. The monovalent cations are preferably added in the form of sodium chloride, the amount of added material being dependent on the selectivity of the cation-exchange resin for sodium at the total ion concentration of the liquid after the addition of sodium salt to the blowdown and the chemical efficiency attained in the regenerator section. In practice, the amount of sodium ions to be added for the purpose of supplementing the sodium ions present in the evaporator blowdown is always less than the stoichiometric equivalent of the calcium and magnesium ions present in the water to be purified, and hence is substantially less than the amount of salt which would be required for treating an equal quantity of raw water of equal hardness by any of the "fixed-bed" processes proposed hitherto.

We claim:

1. A continuous process for reducing the formation of scale on the heat-transfer surface or surfaces of an evaporator, which comprises the steps of passing raw water to be evaporated upwardly in counter-current contact with an ion-exchange material which is passed continuously and downwardly through a treatment vessel so that scale-forming constituents contained as bivalent ions in said raw water are absorbed from said water prior to its entry into said evaporator and are replaced by monovalent ions from said ion-exchange resins, withdrawing some of the thus treated water from the upper portion of the treatment vessel and distilling some of the thus-treated water in said evaporator, continuously withdrawing the bivalent ion enriched resins from the lower portion of the treatment vessel and conveying the same to a regenerator vessel, continuously passing said bivalent-ion-enriched resin through said regenerator vessel in counter-current contact with a regenerant solution which comprises undistilled concentrated solution enriched with monovalent ions discharged from said evaporator, and returning regenerated resin from said regenerator vessel to said treatment vessel.

2. A process according to claim 1, in which said regenerated resin is returned from said regenerator vessel to said treatment vessel in a liquid carrier from which said resin is separated prior to its entry into said treatment vessel.

References Cited in the file of this patent

UNITED STATES PATENTS

| 2,671,714 | McIlhenny | Mar. 9, 1954 |
| 3,019,183 | Gomella | Jan. 30, 1962 |
| 3,056,651 | McIlhenny et al. | Oct. 2, 1962 |

OTHER REFERENCES

Standiford et al.: "Stop Scale in Sea Water Evaporators," Chemical and Engineering Progress, vol. 57, No. 1, January 1961, pages 58–63.